3,282,795
PRODUCTION OF 2-KETOGLUCONIC ACID BY SERRATIA MARCESCENS
Theressa J. Misenheimer, Peoria, Ill., assignor to the United States of America as represented by the Secretary of Agriculture
No Drawing. Filed Oct. 5, 1964, Ser. No. 401,742
1 Claim. (Cl. 195—47)

A nonexclusive, irrevocable, royalty-free license in the invention herein described, throughout the world for all purposes of the United States Government, with the power to grant sublicenses for such purposes, is hereby granted to the Government of the United States of America.

This invention relates to an improved process for preparing 2-ketogluconic acid by microbiological means. More specifically, this invention relates to a remarkably rapid process for the production of essentially quantitative yields of 2-ketogluconic acid employing the organism *Serratia marcescens* NRRL B–486.

The compound 2-ketogluconic acid, used widely as an intermediate for the production of isoascorbic acid, is at the present produced commercially in yields not exceeding about 60–65 percent based on the glucose by fermenting bacteria of the genus *Pseudomonas* under aerobic conditions for about 40–72 hours as taught in Lockwood et al., U.S. Patent No. 2,277,716, and by Pfeifer et al., Ind. Eng. Chem. 50: 1009 (1958).

It has also been indicated in Sharpe et al., U.S. Patent 2,776,926, that 2-ketogluconic acid is formed as a transitory intermediate in the biological formation of alpha-ketoglutaric acid (AKG) by *Serratia marcescens* NRRL B–1481, which fermentation requires about 10 to 12 days for substantially complete utilization and conversion of the carbohydrate nutrient. However, there is no suggestion in the said Sharpe et al. patent that 2-ketogluconic acid is produced at any time to the exclusion of AKG nor that any strain or species of *Serratia marcescens* would complete its carbohydrate conversion in as short and commercially advantageous time as 16 to 32 hours.

A primary object of the instant invention is the discovery of a greatly shortened microbiological process for obtaining essentially quantitative yields, based on the carbohydrate source of 2-ketogluconic acid, preferably in the form of its calcium salt, the formation of which helps prevent acidification of the fermentation. Another object is a commercially advantageous process for very rapidly obtaining essentially quantitative conversions of glucose to 2-ketogluconic acid without a concurrent formation of alpha-ketoglutaric acid that would then require a troublesome separation procedure. The unobvious accomplishment of the above and related objects will be better appreciated by reference to the following detailed specification.

We have now discovered that a strongly aerobic fermentation of *Serratia marcescens* NRRL B–486 in an inexpensive buffered medium optimally containing 10 to 12 percent glucose, 3 percent $CaCO_3$, as well as nitrogenous and trace metal sources provides substantially theoretical yields of 2-ketogluconic acid in the form of its calcium salt in from about 16 to 32 hours with no concurrent production of alpha-ketoglutaric acid, fermentations longer than about 16 hours being required only with glucose concentrations exceeding 12 percent or when repeated additions of glucose are employed.

The following specific example is intended to more precisely inform those skilled in the art as to the more preferred detailed conduct of the invention. However, it is appreciated that the invention is susceptible to a variety of art-recognized modifications of technique including that of employing a lower concentration of glucose and then periodically or continuously replenishing the latter.

*Example 1*

Three 20-liter baffled stainless steel fermentors were each charged with 8 liters of a fermentation medium having the composition per liter shown in the following table.

TABLE I

| Ingredient: | Gm. or ml. |
|---|---|
| $(NH_4)_2SO_4$ | 1.90 |
| $Na_2SO_4$ | 0.50 |
| $MgSO_4$ | 0.40 |
| $KH_2PO_4$ | 5.00 |
| NaCl | 0.04 |
| $MnSO_4 \cdot 4H_2O$ | 0.04 |
| $Fe(NH_4)_2(SO_4)_2 \cdot 6H_2O$ | 0.05 |
| Glucose | 114.00 |
| $CaCO_3$ | 30.00 |
| $H_2O$ qsad. | 1000.00 |

After steam autoclaving the charged fermentors and cooling them to 30° C., each was given 400 ml. (5% v./v.) of a 32-hour growth in 100 parts of the medium of Benedict et al., Appl. Microbiol., 5: 308 (1957), of inoculum suspension obtained by suspending in respective 5.2 ml. portions of sterile water each of many slant cultures of the organism *Serratia marcescens* NRRL B–486 first grown for 24 hours at 28° C. on the tryptone-agar medium of Haynes et al., Appl. Microbiol., 3: 361 (1955). Aeration and agitation were found to be extremely important for rapid formation of 2-ketogluconic acid, air volumes of 0.5 to 0.75 v./v./min. and agitator speeds of 300 to 400 being found necessary. Under these conditions extensive foaming occurred, but this was controlled by periodic additions of a foam inhibitor such as "Antifoam B," Dow-Corning. The fermentations maintained at 30° C. were continued for a total of 16 hours at which time glucose oxidase determinations showed that the concentration of glucose had fallen to the level of 0.228 percent, indicating the utilization of 98 percent of the original glucose. Following removal of the cells by centrifugation, evaporation to dryness of a 500 ml. aliquot of the pooled fermentations gave 64 g. of crude calcium salt of 2-ketogluconic acid, indicating substantially quantitative conversion of the glucose to 2-ketogluconic acid. Treatment of the 2-ketogluconate with HCl liberated the desired free acid.

Fermentations in which the original concentrations of glucose were between 6 percent and about 8 percent gave a very rapid rate of 2-ketogluconate formation but the production levels off and the yields are well below theoretical, thus suggesting that some of the glucose is used in alternate metabolic pathways that more closely resemble the classical concept of *Serratia marcescens* metabolism in which a variety of products are formed, e.g., formic acid, acetic acid, and ethanol. On the other hand, it was found that when the glucose concentration exceeds 12 percent, the rate of 2-ketogluconate formation is markedly depressed, presumably from excessive osmotic effects of the glucose and/or the calcium 2-ketogluconate, and much glucose is left unused even after 32 hours.

Having fully disclosed the best mode of my invention, I claim:

A rapid process for forming 2-ketogluconic acid in substantially theoretical yields in a buffered fermentation medium containing about 12 percent by weight of glucose, a nitrogen source, trace metal compounds, and sufficient $CaCO_3$ for forming the salt of the said acid, said process comprising inoculating 100 parts by volume of said medium with 5 parts of a 32-hour subculture from an aqueous dispersion of a 24-hour slant of *Serratia marcescens* NRRL B–486 on a tryptone-agar medium, aerating and agitating the inoculated fermentation at rates respectively of 0.5 to 0.75 v./v./min. and 300–400 r.p.m., and harvesting the desired 2-ketogluconic acid as the calcium salt at about 16 hours after adding the inoculum.

No references cited.

A. LOUIS MONACELL, *Primary Examiner.*

L. M. SHAPIRO, *Examiner.*